C. W. CONNER.

METHOD OF PRODUCING BIFOCAL LENSES.

APPLICATION FILED MAY 2, 1919.

Reissued Mar. 23, 1920.

14,822.

3 SHEETS—SHEET 1.

INVENTOR.

CHARLES W. CONNER.

BY

Lockwood & Lockwood

ATTORNEY

C. W. CONNER.

METHOD OF PRODUCING BIFOCAL LENSES.

Reissued Mar. 23, 1920. APPLICATION FILED MAY 2, 1919.

14,822.

3 SHEETS—SHEET 2.

INVENTOR.
CHARLES W. CONNER.
BY
Lockwood & Lockwood
ATTORNEYS

C. W. CONNER.

METHOD OF PRODUCING BIFOCAL LENSES.

Reissued Mar. 23, 1920. APPLICATION FILED MAY 2, 1919.

14,822.

3 SHEETS—SHEET 3.

INVENTOR.
CHARLES W. CONNER

BY

Lockwood & Lockwood

ATTORNEYS

UNITED STATES PATENT OFFICE.

CHARLES W. CONNER, OF WILMINGTON, NORTH CAROLINA, ASSIGNOR TO ONEPIECE BIFOCAL LENS COMPANY, OF INDIANAPOLIS, INDIANA, A CORPORATION.

METHOD OF PRODUCING BIFOCAL LENSES.

14,822. Specification of Reissued Letters Patent. Reissued Mar. 23, 1920.

Original No. 925,802, dated June 22, 1909, Serial No. 153,697, filed April 21, 1903. Application for reissue filed May 2, 1919. Serial No. 294,280.

*To all whom it may concern:*

Be it known that I, CHARLES W. CONNER, a citizen of the United States, residing at Wilmington, in the county of New Hanover and State of North Carolina, have invented a new and useful Method of Producing Bifocal Lenses, of which the following is a specification.

The object of my invention is to produce by successive steps from a single piece of crystal a lens which shall have upon one face a pair of surfaces of different dioptrics, said surfaces being produced either simultaneously or in succession, as hereinafter described.

In order that my process may be thoroughly understood, the accompanying drawings illustrate apparatus by means of which the process may be performed, and also illustrate several forms of the result of my process.

Figure 1:
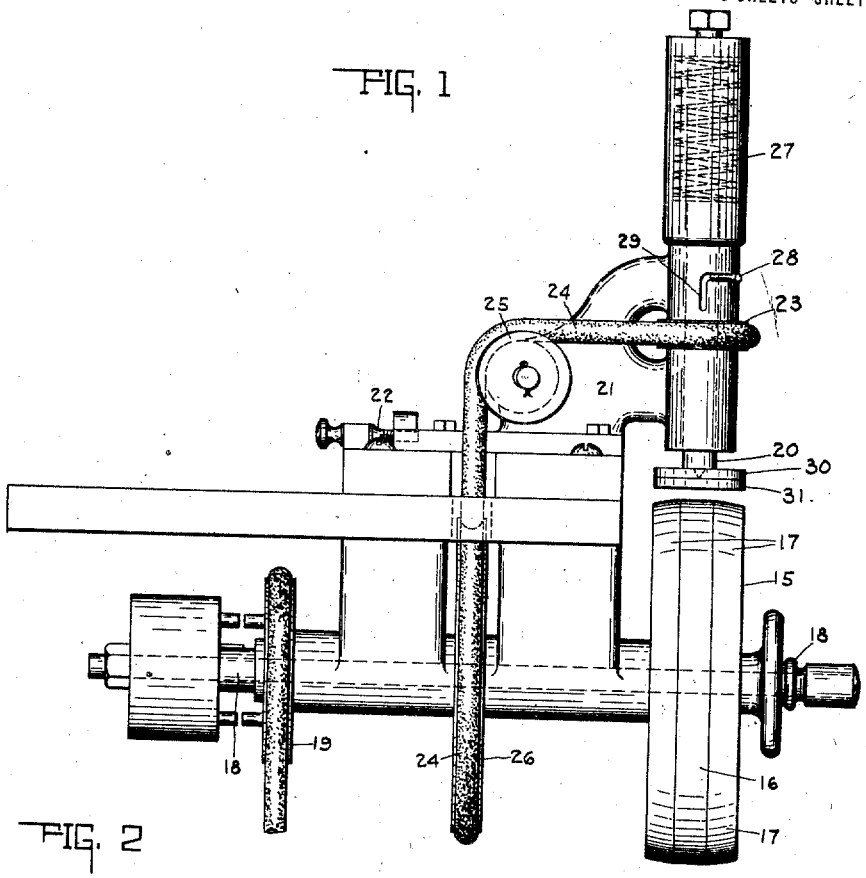
Figure 2:
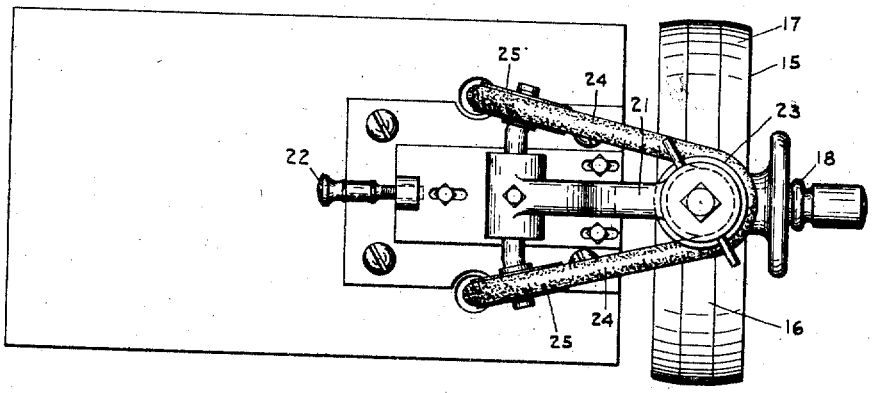
Figure 3:
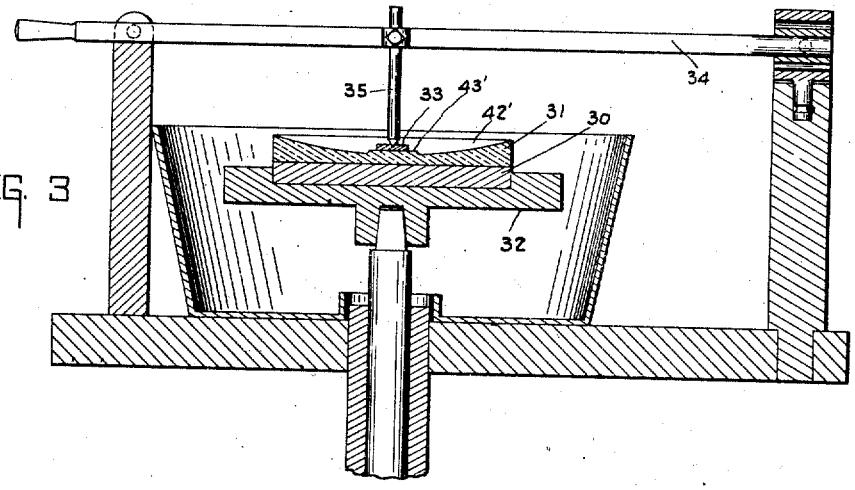
Figure 11:
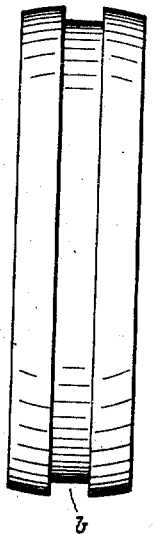
Figure 4:
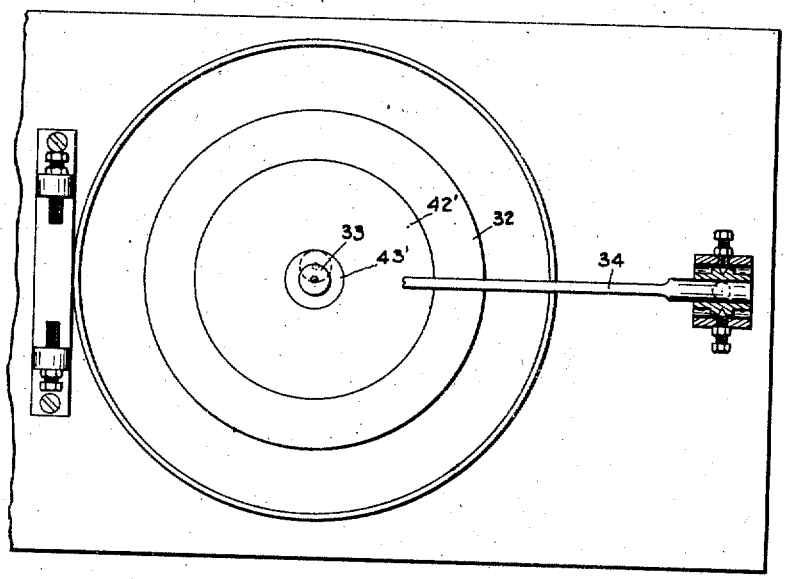
Figure 5:
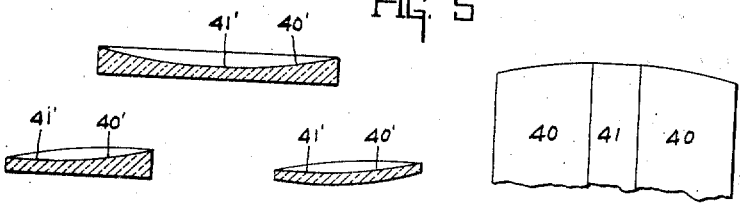
Figure 6:
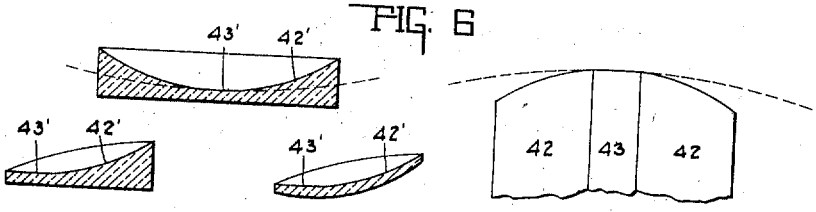
Figure 7:
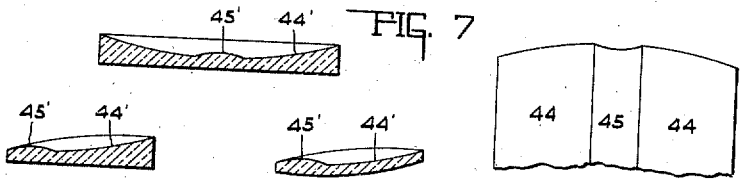
Figure 8:
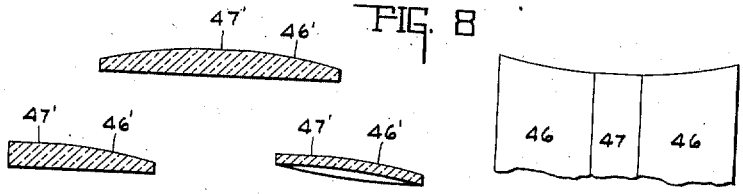
Figure 9:
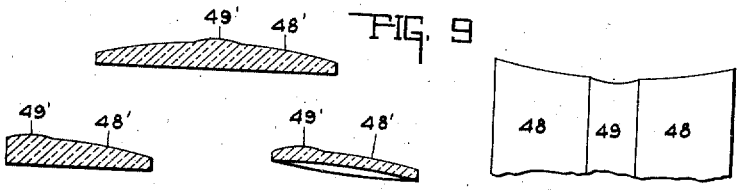
Figure 10:
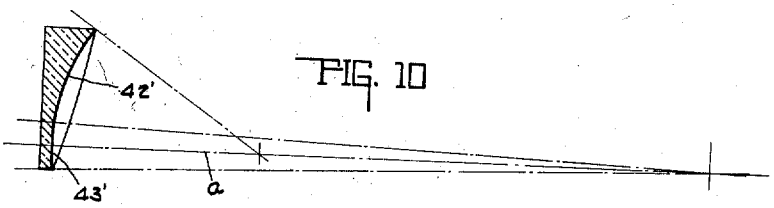

Figure 1 is an elevation of one form of my improved grinding wheel together with an apparatus for using the same. Fig. 2 is a plan thereof. Fig. 3 is a vertical section of the apparatus for finishing one of the surfaces. Fig. 4 is a plan thereof. Fig. 5 is a view showing a transverse section of a crystal provided on one face with a concave surface and an internal plain surface; a vertical section of an eye glass lens cut from the crystal; a similar section thereof finished on the opposite side; and a partial elevation of a grinding element for producing the crystal. Fig. 6 is a view showing a transverse section of a crystal provided with a concave surface of one dioptric and an internal surface of a different dioptric; a vertical section of an eye glass lens cut from the crystal; a similar section finished on the opposite side; and a partial elevation of a grinding element for producing the crystal. Fig. 7 is a transverse section of a crystal provided on one face with a concave portion and an intermediate convex portion; a vertical section of an eye glass lens cut from the crystal; a similar section finished on the opposite side; and a partial elevation of a grinding element for producing the crystal. Fig. 8 is a transverse section provided on one face with a convex portion and an intermediate plain portion; a vertical section of a lens cut from the crystal; a similar section finished on the opposite side; and a partial elevation of a grinding element for producing the crystal. Fig. 9 is a section with a convex portion and an intermediate convex portion of different dioptrics; a vertical section of an eye glass lens cut from the crystal; a similar section finished on the opposite side; and a partial elevation of a grinding element for producing the crystal. Fig. 10 is a diagram of the lens shown in Fig. 6. Fig. 11 is an elevation of a grinding wheel in which the intermediate portion is sufficiently depressed so that it will not serve as a grinding surface.

In Figs. 1 to 4 inclusive, 15 indicates a grinding wheel, the intermediate peripheral portion 16 of which is parallel with the axis of rotation while the edge portions 17, 17 are convex. Wheel 15 is mounted upon the arbor 18 and rotated by means of a pulley 19. Mounted above wheel 15, preferably but not necessarily, at right angles to arbor 18, is a lens rotating arbor 20 journaled in a suitable bracket 21 which is adjustable along a line substantially parallel with the axis of arbor 18 by any suitable means such as an adjusting screw 22. Arbor 20 is rotated, preferably at a considerably higher speed than arbor 18 by means of a pulley 23 and belt 24 which belt passes around idlers 25 and a driving wheel 26 carried by arbor 18. Arbor 20 is capable of vertical movement within its bearing bracket 21 toward and from the periphery of the grinding wheel 15 and is normally forced downward by a spring 27. The arbor 20 is preferably held in its upper position by means of a sleeve mounted within the bearing of bracket 21 and provided with a pin 28 projecting through a bayonet slot 29.

In operation the lower end of arbor 20 is adapted to engage and rotate the lens holding head 30 to which crystal 31 is attached in the usual manner. The crystal 31 may preferably be roughed out, so as to partially conform with the curvature of the grinding surfaces 17, by the ordinary grinding means which need not be here described. After the head 30 together with its attached crystal 31 has been connected to arbor 20, it is held in engagement with the periphery of the grinding wheel 15 by spring 27 and the parts then rotated, the grinding wheel upon its arbor 18, and the crystal 31 upon the axis of arbor 20. The grinding surface 16 operates to produce a central lens surface concentric with the arbor 20 and the grinding surfaces 17, 17 simultaneously operate to produce a lens surface concentric with arbor 20 and surrounding the lens surface produced by the grinding surface 16.

If desired, the two lens surfaces may be ground and finished by the same or similar wheels, but in practice, I find that this may result in an imperfect central lens surface for the reason that slight irregularities in the surface 16, especially in a line directly beneath or very closely beneath the axis of arbor 20, may possibly produce concentric ridges and hollows in the lens surface. For that reason after the crystal 31 has been roughed out by the wheel such as shown in Fig. 1, where the surfaces 15 and 17, 17 have substantially the proper dioptrics for the two desired surfaces, I remove said wheel and substitute therefor a wheel such as that shown in Fig. 11 where the intermediate grinding surface is removed, as at *b*, and grinding is continued until a slight surplus of material is left in the center of the crystal, as shown in Fig. 3. The external surface is finished with a wheel similar to the wheel shown in Fig. 11, or by any other desired means, and the crystal is then transferred to the rotating head 32 shown in Fig. 3, and there rotated in conjunction with a grinding plate 33, the under face of which has been given the proper dioptric curve desired for the central surface and the surplus material of the center of the crystal is then reduced by this grinder until the line of junction between the central surface and the surrounding surface is made practically invisible. The grinding plate 33 is of less diameter than the lens surface which it is to grind and finish, so that, as it is moved transversely of the crystal across its center by the arm 34, it will be rotated upon the pin 35 as an axis, by reason of the rotation of the crystal 31 by head 32.

In Fig. 5 I have shown a portion of the periphery of a grinding wheel having a pair of separated surfaces 40, 40 which are of the same dioptric and an intermediate grinding surface 41 which is parallel with the axis of rotation. Such a wheel will produce a lens such as shown in Fig. 5 with a flat central circular surface 41′. The finished eye glass lens is also shown in the same figure, a portion of the crystal having been removed so as to bring the surface 41′ to one edge of the finished lens. The lens after being finished on the opposite side is also shown.

In Fig. 6 the surfaces 42, 42 are of a plus dioptric which is greater than the plus dioptric of the intermediate surface 43. This wheel will produce the lens shown with a minus central surface 43′ and a surrounding minus surface 42′ of smaller dioptric. The lens after being finished on the opposite side is also shown.

In Fig. 7 the grinding surfaces 44, 44 are plus, while the intermediate surface 45 is a minus dioptric and consequently the lens produced has a central plus surface 45′ and a surrounding minus surface 44′. The lens after being finished on the opposite side is also shown.

In Fig. 8 the minus grinding surfaces 46, 46 have a plain surface 47 interposed and this will produce a lens having a central flat circular portion 47′ and a surrounding plus surface 46′. The lens after being finished on the opposite side is also shown.

In Fig. 9 the grinding surfaces 48, 48 are minus and the intermediate grinding surface 49 minus of a greater dioptric thus producing a lens having an intermediate plus surface 49′, and a surrounding plus surface 48′. The lens after being finished on the opposite side is also shown.

In Fig. 10 I have shown a section of the eye glass lens illustrated in Fig. 6 and have further shown that the short radius *a* is common to both of the lens surfaces 42′ and 43′.

It will be readily understood that, if desired, one of the grinding surfaces 17, 17 may be omitted, or if desired, a single grinding surface off-set with relation to the arbor 20 may be used for producing the external or surrounding lens surface, but both of these changes would probably prove to be objectionable for the reason that in that case the head 30 would have to be rigidly connected with the arbor 20 and there would not be that flexibility of grinding action which appears to be essential for the production of an accurate lens.

After the large lens, being the first lens illustrated in Figs. 5, 6, 7, 8 and 9, has been provided on one face with two bifocal surfaces, one surrounding the other, it is reduced to substantially the size of an eye glass or spectacle lens, as shown in the small lens illustrated in Figs. 5 to 9, by cutting or removing a portion of the lens so that the smaller surface will lie at the lower edge of the finished lens. It is thus possible to produce from a single crystal a bifocal lens with the "near vision portion" properly positioned at the lower edge.

After said small lens, shown in Figs. 5 to 9, which is approximately the size of an eye glass or spectacle lens, has been thus formed, the side of the crystal opposite the side upon which the two surfaces of different dioptrics have been formed, is given the desired dioptric conformation to complete the lens, as illustrated in Figs. 5 to 9. This may be done by any surfacing apparatus, and is done after the bifocal side has been formed, as above set forth, and after the large lens, shown in Figs. 5 to 9, has been cut to eye glass size. That has the effect of changing the optical centers of the two bifocal surfaces from the center of the small lens surface. The optical center of the reading portion is thus moved to a point between the edge thereof and the line of joinder between the two surfaces and the optical center of the distance portion may fall within the distance portion of the lens, and this renders the lens comfortable and satisfactory to the eyes.

In the large lens having one visual surface surrounding the other, as shown in the first lenses illustrated in Figs. 5, 6, 7, 8 and 9, the inner surface, which is smaller than the surrounding surface, has a greater positive focal power than such surrounding surface, so that when the lens is completed, as above explained, the smaller and previously central surface becomes the lower and reading surface of the lens, while the larger and previously surrounding surface will become the upper and distant surface of the finished lens, and said smaller and lower portion of the finished lens is optically stronger than the larger and upper portion of the lens.

The invention claimed is:

1. The process of making a bifocal lens from one piece of glass, including as a step therein the simultaneous generation of two concentric spherically disposed visual surfaces of different dioptrics upon one face of the piece of glass.

2. The process of making a bifocal lens from one piece of glass, which process consists in first grinding two concentric spherically-disposed visual surfaces of different dioptrics upon one face of the piece of glass, so that the glass will be smooth and even and have a uniform thickness at the line of junction of said visual surfaces, second, in removing a portion of said piece of glass to give the remainder the form of a finished lens and so that the inner visual surface will lie near one edge of the finished lens, and third, in forming the other face of said piece of glass with the desired conformation.

In witness whereof I have hereunto set my hand at the city of Wilmington, county of New Hanover, and State of North Carolina, this 17th day of April, 1919.

DR. CHARLES W. CONNER.